United States Patent Office.

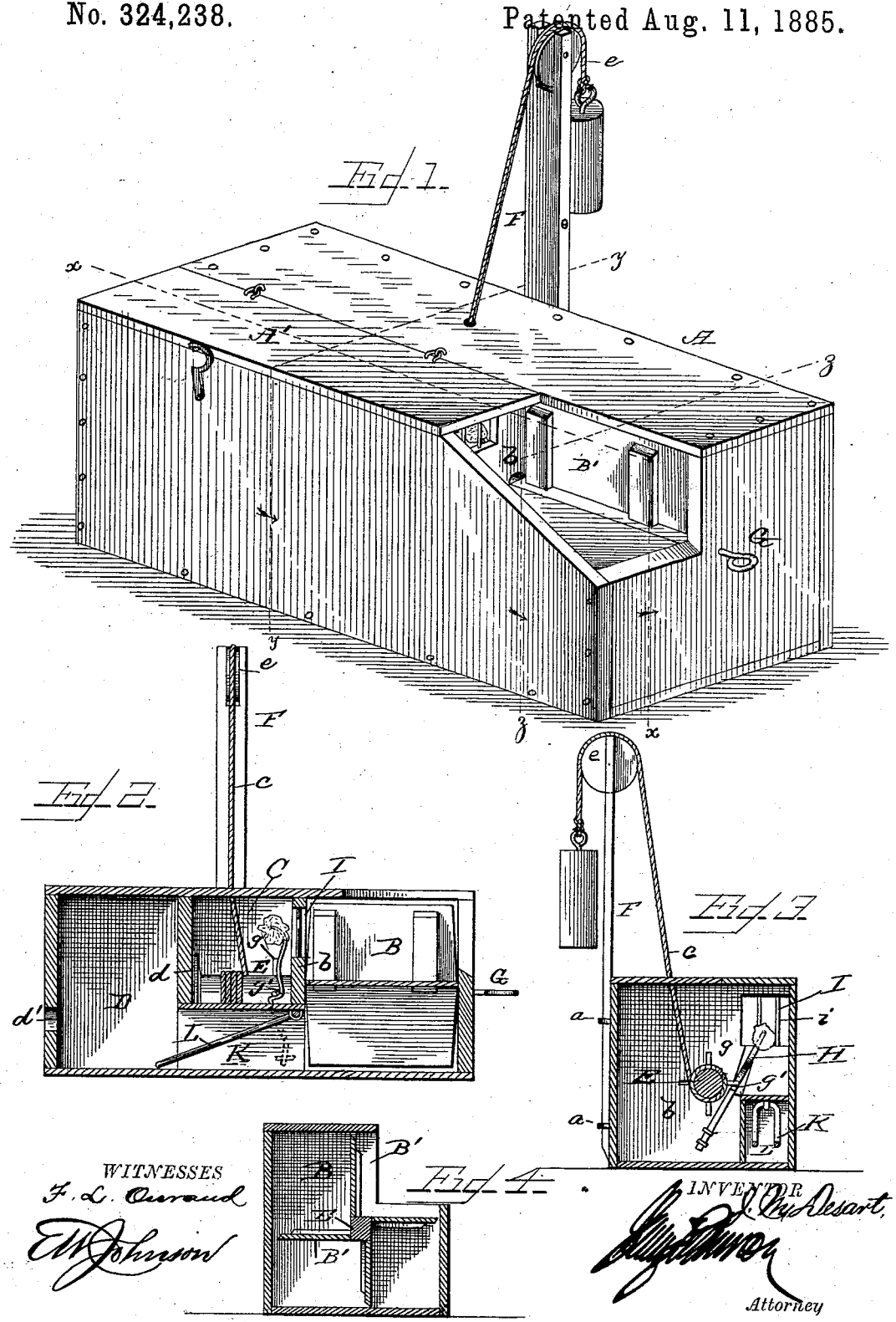

JOSHUA M. DESART, OF HILLSBOROUGH, ILLINOIS.

ANIMAL-TRAP.

SPECIFICATION forming part of Letters Patent No. 324,238, dated August 11, 1885.

Application filed October 7, 1884. (No model.)

*To all whom it may concern:*

Be it known that I, JOSHUA M. DESART, a citizen of the United States of America, residing at Hillsborough, in the county of Montgomery and State of Illinois, have invented certain new and useful Improvements in Animal-Traps; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in self-setting animal-traps; and it consists in the construction and combination of the parts, as will be hereinafter fully set forth, and pointed out in the claims.

In the accompanying drawings, Figure 1 is a perspective view; Fig. 2, a longitudinal sectional view taken through the line $x\ x$ of Fig. 1. Fig. 3 is a vertical sectional view taken through the line $y\ y$. Fig. 4 is also a sectional view taken through the line $z\ z$.

A represents a rectangular box, the end and side being cut away, as shown, so as to provide an entrance into the compartment B. The top of the box is made in two sections, and is provided with a hinged door, A', which is of less length than the major portion of the top, which is rigidly secured to the end and side. The box A is divided transversely into three compartments, B, C, and D, said compartments being separated from each other by walls $b\ d$. A shaft, E, is pivoted or journaled centrally to the wall $d$, and passes through a circular opening in the wall $b$, the portion of the shaft within the compartment C being cylindrical, so as to provide a drum, around which is wound a cord, $c$, which passes over a pulley, $e$, secured to the top of an upright, F, which is attached removably to the box A by staples $a\ a$. The portion of the shaft E within the compartment B is rectangular in cross-section, and has attached thereto wings or blades B', as shown in Fig. 4, so as to provide a revolving platform. The wings B' are of sufficient length to extend across the opening at the corner of the box, one of the wings extending vertically, while the one which forms the floor is horizontal. The outer end of the shaft is provided with a key or crank-handle for rotating the same, said rotating means being indicated by the letter G. The shaft within the compartment C is provided with projecting pins $g$, which engage with a shoulder, $g'$, formed on the spring bait-hook H, which is attached to the wall $b$ under the shaft E, as shown in Fig. 3. Immediately in front of the bait-hook the wall $b$ is provided with an opening, I, which is provided with wires $i$, which are placed at sufficient distance apart to prevent an animal entering said compartment; and the compartments B D are connected to each other by a passage-way, K, to the front end of which, at the upper portion thereof, is attached a wire trap-door, L, as shown in Fig. 2. The outer wall of the compartment D, opposite the passage-way K, is provided with a window or opening, $d'$.

The operation of my invention is as follows: To set the trap the key G is turned so as to wind the cord $c$, which is provided with a weight, upon the drum E. The stop-pins $g$ will engage with the notch $g'$ and prevent the shaft from rotating. By means of the spring bait-hook and the pins upon the rotating shaft the trap is rendered self-setting. When the trap is set, which is done automatically, the animal when entering said trap will stand upon the platform and attempt to withdraw the bait through the opening I. The movement of the bait toward this opening will release the shaft, which will rotate and drop the animal into the lower portion of the compartment B. The animal when in the lower portion of the compartment will seek to escape therefrom by passing through the passage-way K and will enter the compartment D, from which it can be removed by raising the hinged door A'.

I claim—

1. In an animal-trap, a box cut away at its corner and top, as shown, and provided with a horizontal shaft and rotating mechanism, wings B' attached to said shaft, so as to rotate in a compartment, a spring bait-hook, H, supporting the bait in front of an opening above the horizontal beams B' of the rotating platform, and bent at its center to form a shoulder to engage a projection on said windlass-shaft to lock the same and its wings in position, a passage-way, K, and compartment D, the parts being combined and organized substantially as shown, and for the purpose set forth.

2. In an animal-trap, a receptacle, A, having the sides and ends cut away, as shown, and provided with a hinged top of less length than the major portion of the top, said receptacle being divided into three compartments, a shaft, E, provided within the central compartment with a cylindrical portion, and pins g, adapted to engage with a spring-hook secured to the wall of said compartment, as shown, a revolving platform consisting of wings rigidly attached to the shaft, and a cord, c, weighted at its end, and upright F, passage-way K, having trap-door L suspended from the upper portion thereof, and opening I, adjacent to the upper end of the bait-hook, the parts being combined and organized substantially as shown, and for the purpose set forth.

In testimony whereof I affix my signature in presence of two witnesses.

JOSHUA. M. DESART.

Witnesses:
J. A. ROBINSON,
L. G. TYLER.